US012712398B2

(12) United States Patent
Lu et al.

(10) Patent No.: US 12,712,398 B2

(45) Date of Patent: Aug. 18, 2026

(54) COMMUNICATION METHOD, DEVICE, SERVICE NODE, COMMUNICATION SYSTEM, AND STORAGE MEDIUM

(71) Applicant: ZTE CORPORATION, Shenzhen (CN)

(72) Inventors: Ting Lu, Shenzhen (CN); Bo Dai, Shenzhen (CN); Xiubin Sha, Shenzhen (CN); Li Niu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/693,035

(22) PCT Filed: Aug. 15, 2022

(86) PCT No.: PCT/CN2022/112567

§ 371 (c)(1),
(2) Date: Mar. 18, 2024

(87) PCT Pub. No.: WO2023/040544

PCT Pub. Date: Mar. 23, 2023

(65) Prior Publication Data

US 2024/0333044 A1 Oct. 3, 2024

(30) Foreign Application Priority Data

Sep. 16, 2021 (CN) ......................... 202111087727.4

(51) Int. Cl.
*H02J 50/20* (2016.01)
*H02J 50/00* (2016.01)
(Continued)

(52) U.S. Cl.
CPC ............ *H02J 50/80* (2016.02); *H02J 50/001* (2020.01); *H02J 50/20* (2016.02); *H04W 12/009* (2019.01)

(58) Field of Classification Search
CPC .......... H02J 50/001; H02J 50/20; H02J 50/80; H04W 4/023; H04W 4/80; H04W 12/009
See application file for complete search history.

(56) References Cited

U.S. PATENT DOCUMENTS 9,349,032 B1 * 5/2016 Diorio ................ G08B 13/2482
9,959,435 B1 * 5/2018 Diorio ................ G06F 21/6209
(Continued)

FOREIGN PATENT DOCUMENTS

CN 101977410 A * 2/2011 ............ H04W 48/18
CN 107426671 A 12/2017
(Continued)

OTHER PUBLICATIONS

International Search Report in Application No. PCT/CN2022/112567, dated Nov. 15, 2022, 4 pages, including translation.
(Continued)

*Primary Examiner* — Levi Gannon

(74) *Attorney, Agent, or Firm* — Morgan, Lewis & Bockius LLP

(57) ABSTRACT

Provided are a communication method, a device, a service node, a communication system, and a storage medium. The method includes that radio frequency energy is harvested by receiving a radio frequency signal of a radio frequency energy source node and that information is transmitted to a service node based on the radio frequency energy.

19 Claims, 5 Drawing Sheets

(51) Int. Cl.

| | |
|---|---|
| ***H02J 50/80*** | (2016.01) |
| ***H04W 12/00*** | (2021.01) |

(56) References Cited

U.S. PATENT DOCUMENTS

| | | | | |
|---|---|---|---|---|
| 10,628,725 | B1 * | 4/2020 | Mei | G06K 19/07309 |
| 2003/0032993 | A1 * | 2/2003 | Mickle | G06K 19/0723 607/60 |
| 2007/0117596 | A1 * | 5/2007 | Greene | H02J 50/20 455/343.1 |
| 2009/0174361 | A1 * | 7/2009 | Duron | H02J 5/00 320/101 |
| 2011/0181237 | A1 * | 7/2011 | Hamedi-Hagh | H02J 50/50 320/108 |
| 2013/0234536 | A1 * | 9/2013 | Chemishkian | H02J 50/40 307/149 |
| 2013/0342323 | A1 * | 12/2013 | Hinman | G06K 7/10287 340/10.1 |
| 2014/0266034 | A1 * | 9/2014 | Lee | H02J 50/40 320/108 |
| 2015/0091706 | A1 * | 4/2015 | Chemishkian | G06K 7/10158 340/10.34 |
| 2018/0138754 | A1 * | 5/2018 | Feki | H02J 50/80 |
| 2018/0197238 | A1 * | 7/2018 | Bergin | G06Q 20/389 |
| 2019/0044392 | A1 * | 2/2019 | Chowdhury | H02J 7/007 |
| 2020/0228150 | A1 * | 7/2020 | Wiklund | H04B 1/04 |
| 2021/0020012 | A1 * | 1/2021 | Shakedd | H04B 1/40 |

FOREIGN PATENT DOCUMENTS

| | | | |
|---|---|---|---|
| CN | 110113785 | A | 8/2019 |
| CN | 110224723 | A | 9/2019 |
| CN | 111769904 | A | 10/2020 |
| WO | WO 2018/043841 | A1 | 3/2018 |
| WO | 2020236665 | A1 | 11/2020 |
| WO | 2021031662 | A1 | 2/2021 |
| WO | 2021154610 | A1 | 8/2021 |

OTHER PUBLICATIONS

Extended European Search Report in Application No. 22868920.4, dated Jul. 23, 2025, 9 pages.

First Chinese Office Action in Application No. 202111087727.4, dated Jun. 19, 2025, 22 pages, including translation.

* cited by examiner

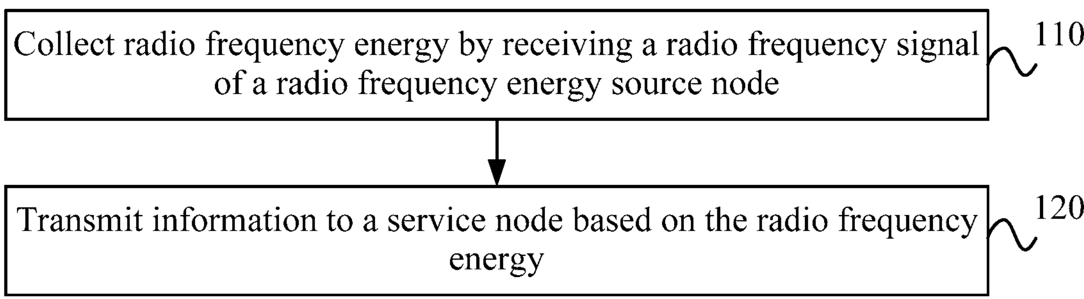
FIG. 4
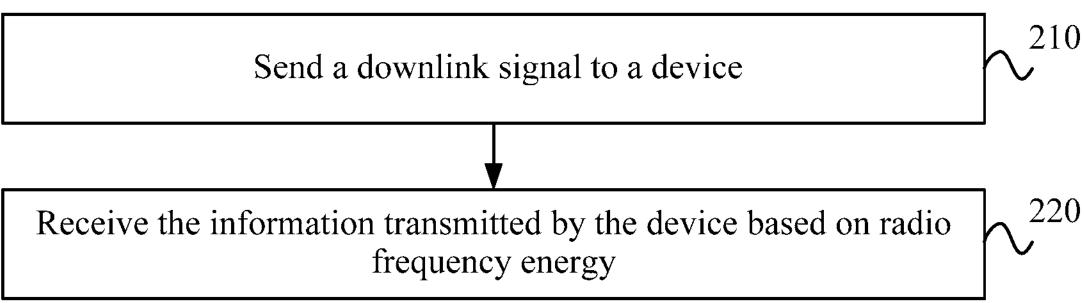
FIG. 5
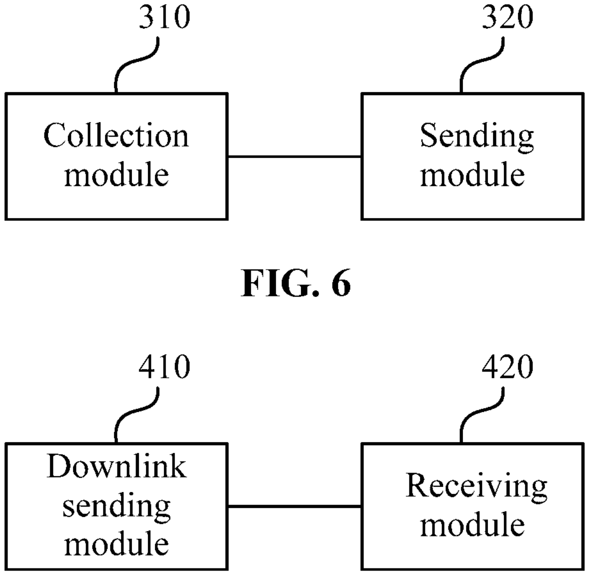
FIG. 6
FIG. 7

COMMUNICATION METHOD, DEVICE, SERVICE NODE, COMMUNICATION SYSTEM, AND STORAGE MEDIUM

CROSS REFERENCE TO RELATED APPLICATIONS

This is a National Stage Application filed under 35 U.S.C. 371 based on International Patent Application No. PCT/CN2022/112567, filed on Aug. 15, 2022, which claims priority to Chinese Patent Application No. 202111087727.4 filed on Sep. 16, 2021, disclosures of both of which are incorporated herein by reference in their entireties.

TECHNICAL FIELD

The present application relates to the field of radio communication technology, for example, a communication method, a device, a service node, a communication system, and a storage medium.

BACKGROUND

In recent years, the Internet of Things technology has been widely applied in various fields, such as smart grids, smart parking, intelligent transportation, and smart energy management systems, promoting the upgrading of various industries and posing more challenges for the Internet of Things technology. For example, tremendous devices are involved in the Internet of Things, requiring a reduction in device costs. In another example, in some scenarios, it is not suitable to integrate a power supply in a device for safety reasons. Alternatively, even if the power supply is integrated in the device, the electricity supplied by the power supply is far from enough. Moreover, since a relatively large number of devices exist and are widely distributed, it takes a lot of manpower or material resources to charge for the devices or replace batteries for the devices. Therefore, the application of the Internet of Things is greatly limited considering such factors as device energy consumption, device costs, as well as deployment and maintenance costs. How to use an energy-limited device to achieve efficient and reliable communication has become an urgent problem for improving the applicability and communication efficiency of the Internet of Things.

SUMMARY

The present application provides a communication method, a device, a service node, a communication system, and a storage medium.

An embodiment of the present application provides a communication method. The method includes that radio frequency energy is collected by receiving a radio frequency signal of a radio frequency energy source node and that information is transmitted to a service node based on the radio frequency energy.

An embodiment of the present application further provides a communication method. The method includes that a downlink signal is sent to a device and that information transmitted by the device based on radio frequency energy is received.

An embodiment of the present application further provides a device. The device includes a memory, a processor, and a computer program stored in the memory and executable by the processor, where when executing the program, the processor performs a preceding communication method.

An embodiment of the present application further provides a service node. The service node includes a memory, a processor, and a computer program stored in the memory and executable by the processor, where when executing the program, the processor performs a preceding communication method.

An embodiment of the present application further provides a communication system. The communication system includes a radio frequency energy source node, the preceding device, and the preceding service node. The service node is connected to the radio frequency energy source node and the device separately.

An embodiment of the present application further provides a computer-readable storage medium for storing a computer program which, when executed by a processor, causes the processor to perform the preceding communication methods.

BRIEF DESCRIPTION OF DRAWINGS

FIG. 4 is a flowchart of a communication method according to an embodiment.

FIG. 5 is a flowchart of a communication method according to an embodiment.

FIG. 6 is a structural diagram of a communication apparatus according to an embodiment.

FIG. 7 is a structural diagram of a communication apparatus according to an embodiment.

DETAILED DESCRIPTION

Figure 1:
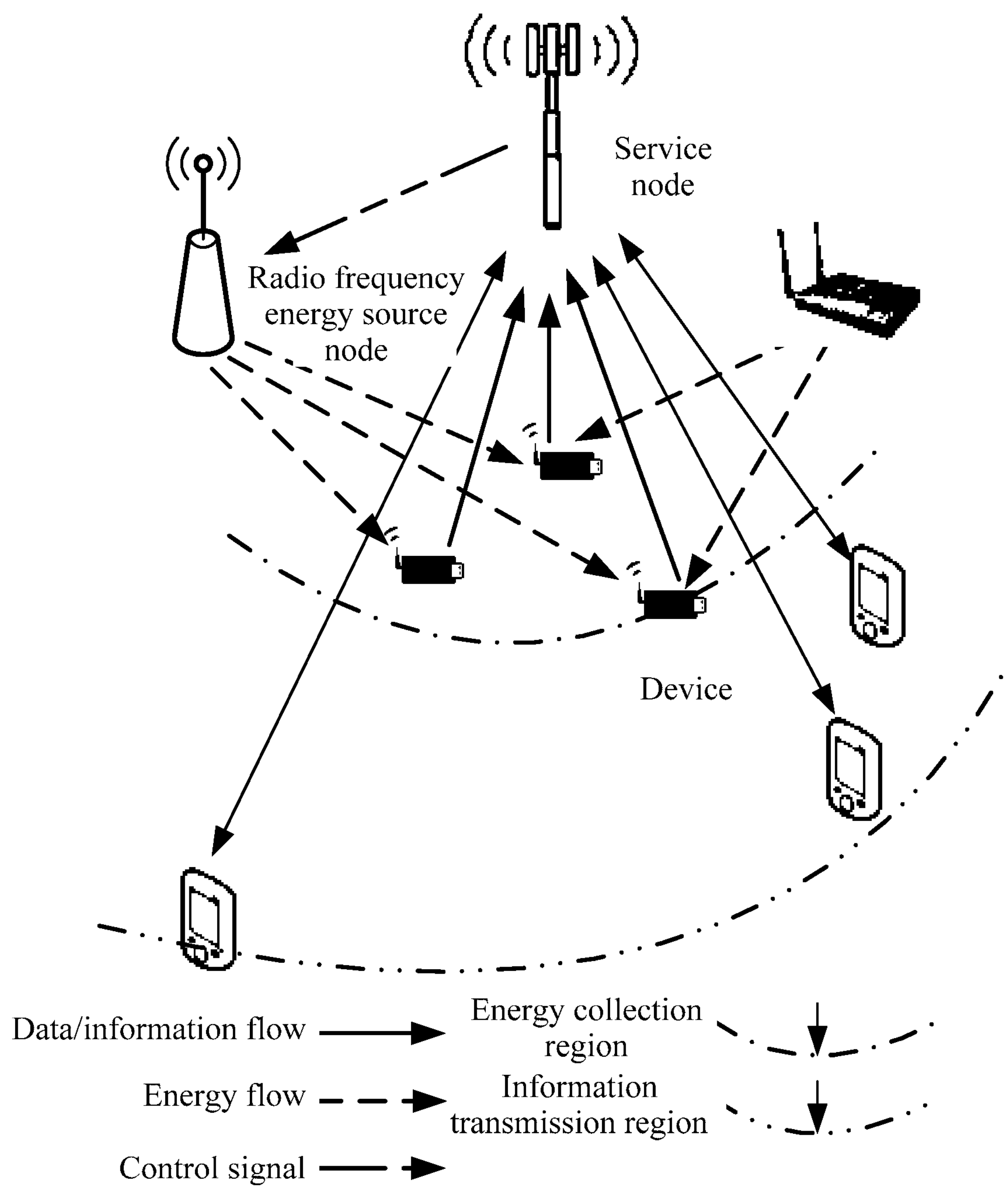
FIG. 1 is a schematic diagram illustrating a type of communication between a device and a service node according to an embodiment.

The present application is described hereinafter in conjunction with the drawings and embodiments. It is to be understood that the embodiments described herein are intended to illustrate and not to limit the present application. It is to be noted that if not in collision, embodiments of the present application and features therein may be combined with each other in any manner. Additionally, it is to be noted that to facilitate description, only part, not all, of structures related to the present application are illustrated in the drawings.

In an embodiment of the present application, a communication method is provided. The method may be applied to any of the following types of devices: passive devices, battery-free devices, devices with rechargeable batteries, and devices capable of storing energy. A device in this embodiment is a device node having the capability of radio frequency energy collection and the capability of information transceiving. The device can collect energy from a radio frequency signal in the surrounding environment and be configured to charge or store energy for a built-in battery. The device can also directly use the acquired energy to modulate to-be-transmitted data and communicate with a service node or another device in a network. The device may include a radio frequency energy collector, a low-power radio frequency transceiver, and an electric energy management module.

The radio frequency energy collector is composed of, for example, a radio frequency antenna, impedance matching, a voltage multiplier, and a capacitor and is configured to receive a radio frequency signal and convert the radio frequency signal into electric energy.

The low-power radio frequency transceiver is configured to send or receive information.

The electric energy management module is configured to determine whether the electric energy acquired from the radio frequency energy collector is stored or immediately used for information transmission. For example, the electric energy management module may work in two modes. One mode is collection-usage. The other mode is collection-storage-usage (a premise of this mode is that an electric energy storage or a rechargeable battery is disposed in the device). In the collection-usage mode, the collected energy is immediately used to supply power to the device. In order to make the device operate normally, the converted electric energy needs to exceed the energy demand of the device node; otherwise, the device may be disabled. In the collection-storage-usage mode, when the collected energy is greater than the consumed energy, the energy is stored in the electric energy storage or the rechargeable battery for subsequent use.

For the collection-usage mode, the device may adjust the antenna impedance of the device to directly reflect the received radio frequency signal and use the signal to modulate the to-be-transmitted data, which is referred to as backscattering. In this mode, energy is collected and used immediately, and a sent signal is referred to as a backscattered signal. An Internet of Things device that supports backscattering technology can be truly passive, that is, has no built-in battery at all. The device receives and sends information by absorbing and directly converting the energy of an excitation signal.

The communication method according to this embodiment of the present application may be applied to the passive Internet of Things based on cellular networks. The passive Internet of Things based on cellular networks may have multiple deployment manners according to the deployment position of a radio frequency energy source node.

FIG. 1 is a schematic diagram illustrating a type of communication between a device and a service node according to an embodiment. As shown in FIG. 1, a radio frequency energy source node is an independent network element configured to supply radio frequency energy to the device. The device communicates with the service node. The radio frequency energy source node may be a specifically-set radio frequency energy source. The service node in a cellular network may control the radio frequency energy source node, for example, setting the operation frequency band of the radio frequency energy source node and controlling the magnitude of the emission power of the radio frequency energy source node. The radio frequency energy source node may also be a node in another non-cellular network, for example, a television, a broadcast television tower, or a wireless fidelity (WiFi) access point.

Figure 2:
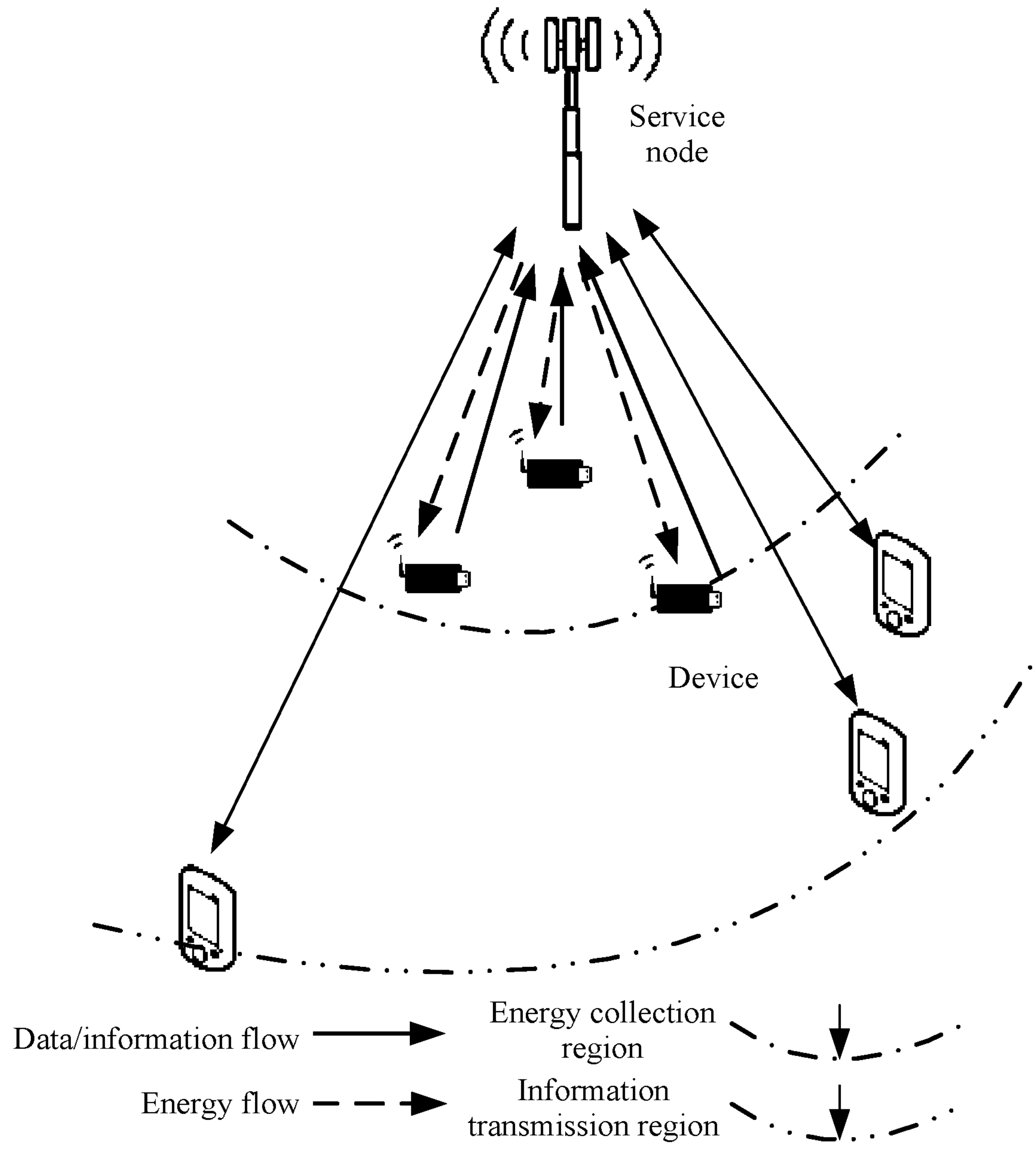
FIG. 2 is a schematic diagram illustrating another type of communication between a device and a service node according to an embodiment.

FIG. 2 is a schematic diagram illustrating another type of communication between a device and a service node according to an embodiment. As shown in FIG. 2, the radio frequency energy source node may be merged with the service node in the cellular network, for example, located on a base station or a relay node.

Figure 3:
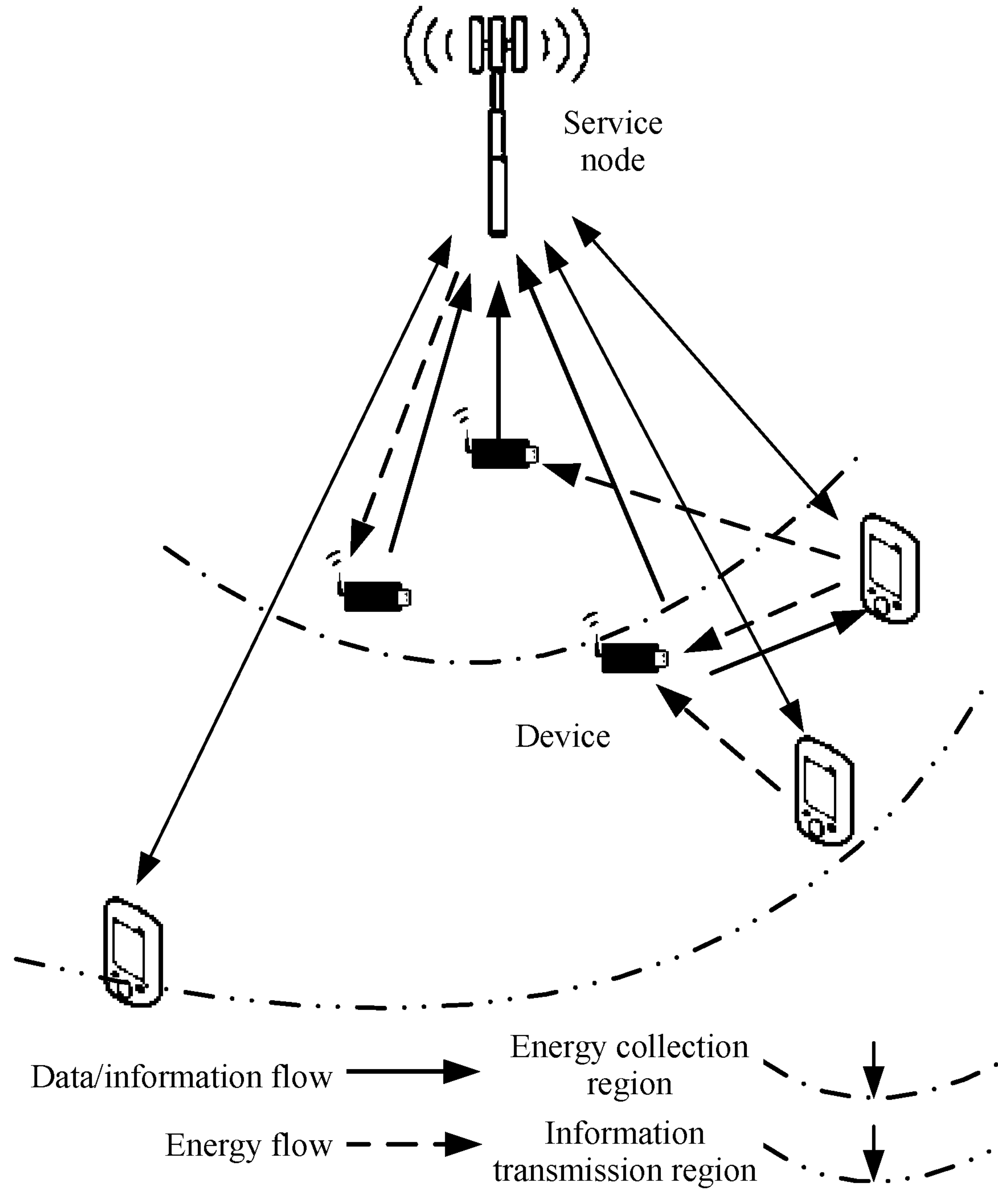
FIG. 3 is a schematic diagram illustrating another type of communication between a device and a service node according to an embodiment.

FIG. 3 is a schematic diagram illustrating another type of communication between a device and a service node according to an embodiment. As shown in FIG. 3, the radio frequency energy source node may be merged with user equipment (UE) or another device. In this case, one device may acquire energy from another closer device, thereby improving the efficiency of energy collection. A multi-hop operation is supported, that is, the passive Internet of Things device may transmit information to another adjacent device (which can be a device or an active device), thereby expanding the communication range.

The distance between the device and the radio frequency energy source node is within a certain range, thereby guaranteeing the efficiency of energy collection. In this embodiment, an energy collection region exists in the passive Internet of Things deployment based on the cellular network. The region is generally smaller than the range of an information transmission region.

FIG. 4 is a flowchart of a communication method according to an embodiment. As shown in FIG. 4, the method provided in this embodiment includes step 110 and step 120.

In step 110, radio frequency energy is collected by receiving a radio frequency signal of a radio frequency energy source node.

In step 120, information is transmitted to a service node based on the radio frequency energy.

In this embodiment, the radio frequency energy source node may be an independent network element or may be integrated in the service node or an adjacent device of a device. When the radio frequency energy source node is an independent network element, the operation frequency band of the radio frequency energy source node, the emission power of the radio frequency energy source node, and the like may be controlled by the service node. When the radio frequency energy source node is integrated in the service node, a downlink signal sent by the service node is taken as the radio frequency signal of the radio frequency energy source node. The device receives the radio frequency signal and converts the radio frequency signal into electric energy which may be stored or directly backscattered, thereby providing the radio frequency energy for information transmission. The service node may refer to, for example, a base station, a relay node or an access point (AP) that is in a cellular network. The transmission information sent by the device to the service node is configured to carry communication data or information (for example, a security code in the registration process, a device identifier of the device, and information related to the reported device position). The transmission information may be a signal (which may be configured to carry relatively simple communication data or information) or signaling (which may be configured to carry relatively complex communication data or information).

For the communication method of this embodiment, the device collects the radio frequency energy through the radio frequency energy source node to support energy for the communication with the service node, implementing efficient and reliable communication and improving the applicability and communication efficiency of the Internet of Things.

In an embodiment, the communication method is applied to at least one of the following devices: a passive device, a battery-free device, a device having a rechargeable battery, or a device capable of storing energy.

In an embodiment, the transmission information includes an uplink backscattered signal.

In this embodiment, for the collection-usage mode, the device may adjust the antenna impedance of the device to directly reflect the received radio frequency signal and use the signal to modulate to-be-transmitted data to obtain a backscattered signal.

In an embodiment, the step in which the information is transmitted to the service node based on the radio frequency energy includes the steps below.

The radio frequency energy is accumulated; and when accumulated radio frequency energy exceeds a preset threshold, the information is transmitted to the service node.

Alternatively, a backscattered signal is generated based on the accumulated radio frequency energy, and the information is transmitted to the service node by using the backscattered signal.

In this embodiment, for the collection-usage mode, the device may adjust the antenna impedance of the device to directly reflect the received radio frequency signal and use the signal to modulate the to-be-transmitted data to obtain the backscattered signal. For the collection-storage-usage mode, the device may accumulate the energy and, when the accumulated radio frequency energy exceeds the preset threshold, use the accumulated radio frequency energy to transmit the information. The preset threshold may be determined according to actual requirements.

In an embodiment, the method further includes the step below.

In step 1110, a code sequence for transmitting the information is selected according to at least one of the following pieces of information: monitored downlink information or the device identifier (ID) of the device.

In this embodiment, multiple code sequences may be configured to transmit the information. The device may select, according to the monitored downlink information and/or the device ID, one code sequence for transmitting the information.

In an embodiment, the method further includes the steps below.

In step 1120, a code sequence set is determined according to the monitored downlink information.

In step 1130, the code sequence for transmitting the information is selected from the code sequence set according to one of the manners below.

The code sequence is selected from the code sequence set at random.

The code sequence is selected from the code sequence set according to the device ID of the device.

In this embodiment, multiple code sequences may be configured to transmit the information. The device may select available code sequences according to the monitored downlink information to form the code sequence set and then select one code sequence at random or according to the device ID for transmitting the information.

In an embodiment, the method further includes the step below.

In step 1140, a security code is transmitted to the service node before transmitting the information to the service node or in the process of transmitting the information to the service node.

In this embodiment, one security code may be maintained between the device and the service node. The device transmits the security code to the service node to complete registration, guaranteeing the security of the communication between the device and the service node. The security code and the transmission information may be sent simultaneously. Alternatively, the security code may be sent before the transmission information by the device to the service node.

In an embodiment, the security code includes at least one of the following: the device ID of the device, an ID pre-stored by the device, or a security code assigned by the service node and received by the device.

In an embodiment, the method further includes the step below.

In step 130, a transmission manner of communication data is determined according to a physical feature of a radio channel between the device and the service node.

In this embodiment, because of dual functions of information and energy transmission of the radio frequency signal and the possibility of using simple modulation and coding technology, the transmission security of the passive Internet of Things may be vulnerable. For example, eavesdropping may happen, or the transmitted information may be maliciously intercepted or tampered with. The transmission manner of the communication data is determined according to the physical feature of the radio channel, for example, multipath fading and propagation delay, thereby improving the security of a physical layer.

In an embodiment, the transmission manner of the communication data includes at least one of the following: The communication data is included in an uplink signal for transmission, the communication data is transmitted along with uplink signaling, the communication data is included in a downlink signal for transmission, the communication data is transmitted along with downlink signaling, data transmission requires feedback, or data transmission does not require feedback.

In this embodiment, uplink mainly refers to a transmission direction from the device to the service node, and downlink mainly refers to a transmission direction from the service node to the device. A requirement for feedback mainly refers to that after successfully receiving or decoding the communication data, the receiving end needs to return acknowledgment information to the sending end. No requirement for feedback mainly refers to that after successfully receiving or decoding the communication data, the receiving end does not need to return acknowledgment information to the sending end.

In an embodiment, the method further includes establishing communication with the service node by using a non-orthogonal multiple access manner.

The step in which the communication is established with the service node by using the non-orthogonal multiple access manner includes at least one of the steps below.

The communication is established with the service node according to a non-orthogonal multiple access manner based on backscattered signal power difference.

The communication is established with the service node by using a non-orthogonal code based on time domain extension. The non-orthogonal code is configured to distinguish devices.

For example, the method further includes step 1150, in which the communication is established with the service node according to the non-orthogonal multiple access manner based on backscattered signal power difference.

In this embodiment, one resource may be assigned to multiple users by using the non-orthogonal multiple access manner. The non-orthogonal multiple access manner based on backscattered signal power difference mainly refers to distinguishing different users effectively according to the power (energy) of different backscattered signals, thereby implementing the assigning of one resource to multiple users, increasing the number of accessed users, and improving the system capacity of the passive Internet of Things.

Non-orthogonal multiple access, such as multi-user shared access (MUSA), can eliminate multiple access interference at the receiving end (for example, the serving node). Through received signals, users may be judged to sequence users eliminating interference. The judgment may be based on the magnitude of user signal power. The service node may assign different signal power to different users to acquire the maximum performance gain of the system and achieve the target of distinguishing users. In this embodiment, due to the interference of various factors in the process of energy collection and information transmission, especially the relatively great effect of the distance from the radio frequency energy source, devices using energy collection or backscattering technology may have a great difference in energy acquisition and emission power. Therefore, non-orthogonal multiple access is combined. The service node may act as a receiver of backscattered signals and is not limited by power consumption and costs. Accordingly, a complex multiple access solution is feasible.

For example, the method further includes step 1160, in which the communication is established with the service node by using the non-orthogonal code based on time domain extension. The non-orthogonal code is configured to distinguish devices.

In this embodiment, one resource may be assigned to multiple users by using the non-orthogonal multiple access manner. The non-orthogonal multiple access based on time domain extension mainly refers to making the coding length of the transmission information different from the perspective of time domain resources, thereby effectively distinguishing different users, improving various aspects including coverage, efficiency and capacity, and improving the transmission energy of signals through time domain extension. Additionally, time domain extension may also avoid the waste of time domain resources caused by a time domain avoidance collision. The non-orthogonal codes may also better suppress the interference between users. In an embodiment, a coding manner of the communication data between the device and the service node is binary on-off keying (OOK).

In this embodiment, simpler uplink coding and modulation technology is used to reduce the power consumption of a passive terminal and especially meet the low power consumption requirements of a transmitter. For example, OOK coding, a special case of amplitude shift keying (ASK), may be used. Such a coding manner can guarantee certain detection reliability for a low-power signal and effectively reduce the power consumption of the transmitter and the power consumption of the receiver.

Additionally, the coding and modulation technology with better performance but with complexity mainly located at the demodulation end (that is, service node) may also be used to guarantee the low power consumption of the passive terminal. An uplink backscattered data transmission channel with low complexity but high efficiency may also be designed. On this basis, under the premise of low-cost and low-complexity hardware design, the emphasis is on improving anti-interference ability, extending the (uplink) transmission distance, and further improving the (uplink) data rate.

In an embodiment, the method further includes step 140, in which environment-related information of the device is determined according to at least one of the following pieces of information: a downlink signal monitored by the device, the quality of the downlink signal monitored by the device, the energy strength of the downlink signal monitored by the device, the quality of an environmental signal monitored by the device or the quality of a peripheral signal monitored by the device, the energy strength of the environmental signal monitored by the device or the energy strength of the peripheral signal monitored by the device, or the number of environmental signals monitored by the device or the number of peripheral signals monitored by the device.

In this embodiment, the downlink signal mainly refers to a signal sent by the service node. The environmental signal may be a signal sent by a terminal other than the service node in the environment of the device. The peripheral signal may be a signal sent by a device (the device or an active device) within a set range around the device. For example, if the device is relatively competent in collecting radio frequency energy or needs relatively much radio frequency energy, the device may also monitor the environmental signal or the peripheral signal in addition to the downlink signal so as to collect more radio frequency energy.

In an embodiment, the method further includes step 150, in which environment-related information of the device is determined through at least one of the manners below.

Downlink signals are monitored continuously.

Environmental signals or peripheral signals are monitored continuously.

The downlink signals are monitored in a duty cycle manner.

The environmental signals or the peripheral signals are monitored in the duty cycle manner.

The downlink signals are monitored in a preset mode.

The downlink signals are monitored in a configured mode.

The environmental signals or the peripheral signals are monitored in the preset mode.

The environmental signals or the peripheral signals are monitored in the configured mode.

In this embodiment, multiple manners may be used for monitoring the downlink signals, the environmental signals, or the peripheral signals. For example, continuous monitoring may be used to make the device collect as much radio frequency energy as possible. In another example, monitoring in the duty cycle manner is used. The higher the duty cycle, the more the collected radio frequency energy. The duty cycle may be adjusted flexibly. The monitoring mode may also be preset or may be configured by the service node or the passive terminal.

In an embodiment, the environment-related information includes one of the following: the information of the position of the device, a positional relationship between the device and an energy collection region, the number of adjacent devices of the device, or a positional relationship between an adjacent device of the device and the device.

In this embodiment, the environment-related information may enable the device to make clear, for example, the position of the device, whether it reaches the energy collection region, and the number or distribution of adjacent devices. On this basis, the device may adjust the monitoring manner or mode, increase or reduce types of monitored signals, and select the best radio frequency energy source so that the device collects the radio frequency energy more flexibly, guaranteeing the reliable energy source of the device and improving the reliability of communication.

In an embodiment, the method further includes step 1610, in which position-related information is reported to the service node when the position of the device is located in an edge region of the energy collection region.

In this embodiment, if it indicates from the environment-related information obtained by monitoring various signals that the position of the device is located in the edge region of the energy collection region, the position-related information may be reported to the service node. For example, the position of the device may be reported; alternatively, it is reported whether the device is located within or outside the energy collection region.

In an embodiment, the method further includes step 1620, in which a cell is selected or re-selected according to the environment-related information.

In this embodiment, the device may determine according to the environment-related information whether the cell changes. On this basis, the cell is selected or re-selected to acquire a better radio frequency energy source and better communication quality.

In an embodiment, the method further includes step 1630, in which a local clock is controlled according to the environment-related information to synchronize with a clock of the service node.

In this embodiment, the device may determine the distance and positional relationship with the service node according to the environment-related information, thereby adjusting the local clock to synchronize with the clock of the service node.

In an embodiment, a radio resource control (RRC) layer of the device uses a connectionless manner for data transmission.

In this embodiment, the connection control function of the RRC layer of the device may be simplified. For example, the device directly carries the communication data in the uplink backscattered signal and eliminates processes including RRC connection establishment, RRC connection restoration, and RRC connection release, with the process of data transmission mainly considered.

In an embodiment, a scheduling layer of the device supports a scheduling algorithm including an energy state related factor. The energy state related factor includes at least one of the following: an absolute value of the strength of the downlink signal or an absolute value of the strength of an energy signal, a determination value of whether the strength of the downlink signal or the strength of the energy signal exceeds a preset threshold, or the strength of the downlink signal or the strength of the energy signal.

In this embodiment, the resource scheduling algorithm is optimized. Because the device uses the energy collection technology, the traditional scheduling cannot meet the requirements of energy collection while guaranteeing fairness. For example, for the need for data decoding, a traditional scheduling algorithm mainly considers the best channel state. However, the energy collected or reflected by the device with the best channel state may not be the strongest or have the best quality. In this embodiment, the energy state related factor is taken into consideration of resources and user scheduling rules, helping select the best channel able to balance information transmission and energy collection for the device, scheduling resources reasonably, improving the resource utilization rate, and guaranteeing communication quality.

The energy state related factor may be the absolute value of the strength of the downlink signal (that is, a radio frequency signal sent by the radio frequency energy source node when merged with the service node) or the absolute value of the strength of the energy signal (that is, a radio frequency signal sent by the radio frequency energy source node when acting as an independent network element), the determination value of whether the strength of the downlink signal or the strength of the energy signal exceeds the preset threshold, or the strength of the downlink signal or the strength of the energy signal.

In an embodiment, the device supports two layers of protocol stacks. A first-layer protocol stack is configured to perform at least one of the following functions: downlink signal monitoring, radio frequency energy collection, backscattered signal modulation, signal monitoring positioning, or positioning process execution. A second-layer protocol stack is configured to perform at least one of the following functions: mobility management, data transmission management, or positioning process execution.

In this embodiment, the device may support two layers of protocol stacks including a physical layer and a high layer (also referred to as, for example, a merge layer or a middle layer.)

In an embodiment, data transmission management includes at least one of the following functions: communication data segmentation, communication data reorganization, communication data cascading, and quality of service management.

The data rate of the passive Internet of Things application is usually very small, with no need of unpacking and packaging. This embodiment simplifies functions of the protocol stacks. For example, a protocol layer in the high-layer protocol stack (that is, the second-layer protocol stack) is allowed to provide functions including communication data segmentation, communication data reorganization, communication data cascading, quality of service (QOS) guaranteeing, such as a packet data convergence protocol (PDCP) layer, a radio link control (RLC) sub-layer, a service data adaptation protocol (SDAP) layer. The selection and simplification of the protocol layer can reduce the overhead of data encapsulation. Additionally, the high-layer protocol stack may use the connectionless manner for data transmission or may directly schedule a data packet.

In an embodiment, the device is in one of the following states: the state of monitoring the downlink signal or the energy signal, the state of information transmission, or the register state of transmitting the device ID or the security code.

In this embodiment, in the register state, the device may transmit only the device ID or the security code and does not need to transmit the communication data or other information.

In an embodiment, the state of the device is able to be changed according to a preset mode; alternatively, the state of the device is indicated by the service node sending the downlink signal.

In an embodiment of the present application, another communication method is provided. The communication method may be applied to a service node. The service node is, for example, a base station, an access point, or a relay node. For technical details not described in detail in the embodiment, reference may be made to any one of the preceding embodiments.

FIG. 5 is a flowchart of a communication method according to an embodiment. As shown in FIG. 5, the method provided in this embodiment includes step 210 and step 220.

In step 210, a downlink signal is sent to a device.

In step 220, the information transmitted by the device based on radio frequency energy is received.

For the communication method of this embodiment, a service node may receive the transmission information sent by the device using the collected radio frequency energy and send the signal to the device, implementing efficient and reliable communication with the device and improving the applicability and communication efficiency of the Internet of Things The device in this embodiment may refer to one or more of the following devices: a passive device, a battery-free device, a device having a rechargeable battery, or a device capable of storing energy.

In an embodiment, the radio frequency energy is collected according to a radio frequency signal of a radio frequency energy source node; alternatively, the radio frequency energy is collected according to the downlink signal.

In this embodiment, when the radio frequency energy source node is an independent network element, the radio frequency energy of the device is collected according to the radio frequency signal of the radio frequency energy source node. When the radio frequency energy is integrated in the service node, the downlink signal sent by the service node may be taken as a source of the radio frequency energy of the device.

In an embodiment, the method further includes the step below.

In step 230, a working parameter of the radio frequency energy source node is controlled. The working parameter includes at least one of the following: frequency band, transmission power, or working mode. The working mode includes a manner of starting and/or stopping power transmission.

In an embodiment, the step in which the downlink signal is sent to the device includes the step below.

The downlink signal is sent to the device by using a set beam mechanism. In the set beam mechanism, the width of a beam is less than a set threshold, or the width of the beam is determined according to a preset rule or the set threshold.

In this embodiment, the service node may serve as a radio frequency energy source. That is, the radio frequency energy source node may be merged with the service node. The efficiency of energy collection can be improved by optimizing the downlink signal of the service node. For example, a dedicated energy transmission signal may be used to enable the device to collect the radio frequency energy; alternatively, a downlink signal used in a cellular network may be multiplexed.

In this embodiment, in the case where the downlink signal is multiplexed, an optimized beam mechanism is adopted. For example, the width of the beam is controlled to narrow the beam, thereby gathering energy, improving the directivity of the downlink signal, improving the efficiency of energy carrying, providing a reliable energy source for the device, and reducing a reception conflict between devices.

In this embodiment, the downlink signal may carry the energy and the downlink transmission information simultaneously. In this case, OOK coding technology may be used to reduce the power consumption of the transmitter and the power consumption of the receiver. A corresponding operation frequency band may be a new radio-unlicensed (NR-U) frequency band or an NR authorized frequency band. In general, the higher the operating frequency band, the more complex the design of an activation radio frequency circuit and the higher the power consumption of the activation radio frequency circuit. It is to be noted that for a backscattered signal, a backscattered transmitter antenna needs no activation radio frequency circuit. Therefore, the power consumption of this part can be ignored even in a high frequency bands. Accordingly, a higher frequency may be considered.

In an embodiment, the downlink signal sent by the service node to the device is configured to at least one of the following: transmit the radio frequency energy to the device, transmit communication data to the device, or carry feedback information corresponding to the backscattered signal.

In this embodiment, in order to avoid communication failure caused by a collision, the device with the function of energy storage may send a request first. Then the service node issues the downlink signal carrying energy and/or data. The device may receive energy regularly and directionally and backscatter the uplink transmission signal. Additionally, the downlink signal sent by the service node may also carry the feedback information about whether the uplink backscattered signal is modulated correctly.

In an embodiment, the method further includes step 240 as below.

The device is positioned according to at least one of the power of the backscattered signal, the beam corresponding to the downlink signal, or an energy value of the received downlink signal fed back by the device.

Alternatively, at least one of the power of the backscattered signal, the beam corresponding to the downlink signal, or the energy value of the received downlink signal fed back by the device is transmitted to a positioning server.

Alternatively, at least one of the power of the backscattered signal, the beam corresponding to the downlink signal, or the energy value of the received downlink signal fed back by the device is transmitted to a core network node so as to be transmitted to the positioning server by the core network node.

In this embodiment, for the case where the radio frequency energy source node is merged with the service node, the device acts as the transmitter and may directly use the received downlink signal energy of a serving base station for modulation and then transmit information. Moreover, the energy of the downlink signal is strongly related to the distance between the transmitter and the service node. Therefore, the energy of the modulated backscattered signal may reflect the distance between the transmitter and the service node. Accordingly, the service node may determine the distance between the device and the service node and even the specific position of the device by detecting the power (or energy strength) of the received uplink backscattered signal; that is, the positioning of the device is implemented. The service node may position the device according to the power of the backscattered signal, the beam corresponding to the downlink signal, and/or the energy value of the received downlink signal fed back by the device. The service node may also transmit such information to the positioning server so that the positioning server positions the device. The service node may also transmit such information to the core network node, and then the core network node transmits such information to the positioning server.

In an embodiment, the method further includes step 250, in which a resource is scheduled according to at least one of the following pieces of information: the condition of the device collecting the radio frequency energy, the capability of the device reflecting the radio frequency energy, the energy strength of the received uplink signal, the energy strength of the received backscattered signal, or a determination value of whether the strength of the uplink signal or the strength of an energy signal exceeds a preset threshold.

In an embodiment, the method further includes the step below.

In step 200, the indication information of a state is sent to the device. The state includes at least one of the following: the state of monitoring the downlink signal or the energy signal, the state of information transmission, or the register state of transmitting a security code.

In an embodiment, the step in which the transmission information sent by the device based on the radio frequency energy is received includes receiving, based on a data packet, the information transmitted by the device.

In an embodiment, the method further includes the steps below.

In step 212, a device ID of the device or the security code is received.

In step 214, the device ID or the security code is transmitted to the core network node; alternatively, an ID of the service node, as well as the device ID or the security code, is transmitted to the core network node.

In an embodiment, the method further includes step 260, in which the security code received from the core network node is transmitted to the device.

In this embodiment, the mobility management mechanism which only includes the interaction between the service node and a core network and is almost transparent to the device may be considered. For example, the device can be grouped and registered with one or several dedicated core network elements. A mapping relationship between two or more of the following pieces of information is established: a dedicated network element identifier, a service node identifier, a device group identifier, and the device ID of the device. The device may not perceive a cell ID during the moving process and may implement energy reflection or energy storage when receiving the downlink signal at any time. The device does not distinguish the source of the downlink signal. After receiving the transmission information (which may be the uplink signal or the backscattered signal), the service node distinguishes the device and routes its signal to a dedicated element for processing based on at least one of the following pieces of information: a non-orthogonal code, the device ID, the direction and/or strength of the transmission information.

In an embodiment, in order to meet the requirements of the management of massive devices, tremendous passive Internet of Things devices exist with simple functions. Dedicated network elements may be introduced into the core network to manage subscription information or user information. For example, a network element may be used for device registration, authentication and certification, thereby guaranteeing safety on the network side.

Additionally, transmission management may also be optimized to provide carrying optimization and QoS guarantee. For example, a control plane signaling flow and a user plane signaling flow are canceled, and the packet-based transmission management mechanism is implemented. That is, the core network does not need to establish control plane carrying and/or user plane carrying for each device. The core network may directly route each received data packet to an application layer according to the information contained in the data packet or the information indicated by the service node. Additionally, mobility management may also be optimized; for example, a mobility policy is optimized.

For the communication method of this embodiment, a passive Internet of Things based on a cellular system is provided regarding the problems in the passive Internet of Things, which can meet the key requirements below.

Coverage is enhanced: The communication distance is extended to tens of meters or even greater, not affected by any shelter and enabling, for example, flexible network architecture design and physical layer design to be performed.

Transmission efficiency is enhanced: The data transmission rate is increased, including performing physical layer design based on backscattering technology and performing simplification based on a cellular system air interface protocol stack; for example, user data encapsulation overhead is reduced.

Access capacity is enhanced: Advanced multiple access technology of cellular networks, such as non-orthogonal multiple access, is combined to support more efficient multi-user multiplexing access, optimizing the balance between power consumption and performance.

User management is enhanced: For example, transmission management, mobility management, and security management are optimized.

Special requirements (for example, device positioning) are met: Advantages of passive tags, such as low costs, easy placement, and energy collection without fear of power exhaustion, and the advantage of cellular networks having types of technology supporting wide-area coverage are combined so that the cellular-based passive Internet of Things may better meet the requirements of people and goods positioning in various scenarios.

An embodiment of the present application further provides a communication apparatus. FIG. 6 is a structural diagram of a communication apparatus according to an embodiment. As shown in FIG. 6, the communication apparatus includes a collection module 310 and a sending module 320.

The collection module 310 is configured to collect radio frequency energy by receiving a radio frequency signal of a radio frequency energy source node.

The sending module 320 is configured to transmit information to a service node based on the radio frequency energy.

For the communication apparatus of this embodiment, a device collects the radio frequency energy through the radio frequency energy source node to support energy for the communication with the service node, implementing efficient and reliable communication and improving the applicability and communication efficiency of the Internet of Things.

In an embodiment, the transmission information includes an uplink backscattered signal.

In an embodiment, the sending module 320 is configured to perform the operation below.

The radio frequency energy is accumulated; and when accumulated radio frequency energy exceeds a preset threshold, the information is transmitted to the service node. Alternatively, a backscattered signal is generated based on the accumulated radio frequency energy, and the information is transmitted to the service node by using the backscattered signal.

In an embodiment, the apparatus further includes a selection module configured to select a code sequence for transmitting the information according to at least one of the following pieces of information: monitored downlink information or the device identifier (ID) of the device.

In an embodiment, the apparatus further includes a set determination module and a selection module.

The set determination module is configured to determine a code sequence set according to the monitored downlink information.

The selection module is configured to select a code sequence for transmitting the information from the code sequence set according to one of the manners below.

The code sequence is selected from the code sequence set at random.

The code sequence is selected from the code sequence set according to the device ID of the device.

In an embodiment, the apparatus further includes a security code transmission module.

The security code transmission module is configured to transmit a security code to the service node before transmitting the information to the service node or in the process of transmitting the information to the service node.

In an embodiment, the security code includes at least one of the following: the device ID of the device, an ID pre-stored by the device, or a security code assigned by the service node and received by the device.

In an embodiment, the apparatus further includes a transmission manner determination module configured to determine a transmission manner of communication data according to a physical feature of a radio channel between the device and the service node.

In an embodiment, the transmission manner of the communication data includes at least one of the following: The communication data is included in an uplink signal for transmission, the communication data is transmitted along with uplink signaling, the communication data is included in a downlink signal for transmission, the communication data is transmitted along with downlink signaling, data transmission requires feedback, or data transmission does not require feedback.

In an embodiment, the apparatus further includes a first establishment module configured to establish the communication with the service node according to the non-orthogonal multiple access manner based on backscattered signal power difference.

In an embodiment, the apparatus further includes a second establishment module configured to establish the communication with the service node by using the non-orthogonal code based on time domain extension. The non-orthogonal code is configured to distinguish devices.

In an embodiment, a coding manner of the communication data between the device and the service node is OOK.

In an embodiment, the apparatus further includes a first information determination module configured to determine environment-related information of the device according to at least one of the following pieces of information: a downlink signal monitored by the device, the quality of the downlink signal monitored by the device, the energy strength of the downlink signal monitored by the device, the quality of an environmental signal monitored by the device or the quality of a peripheral signal monitored by the device, the energy strength of the environmental signal monitored by the device or the energy strength of the peripheral signal monitored by the device, or the number of environmental signals monitored by the device or the number of peripheral signals monitored by the device.

In an embodiment, the apparatus further includes a second information determination module configured to determine environment-related information of the device through at least one of the manners below.

Downlink signals are monitored continuously.

Environmental signals or peripheral signals are monitored continuously.

The downlink signals are monitored in a duty cycle manner.

The environmental signals or the peripheral signals are monitored in the duty cycle manner.

The downlink signals are monitored in a preset mode.

The downlink signals are monitored in a configured mode.

The environmental signals or the peripheral signals are monitored in the preset mode.

The environmental signals or the peripheral signals are monitored in the configured mode.

In an embodiment, the environment-related information includes one of the following: the information of the position of the device, a positional relationship between the device and an energy collection region, the number of adjacent devices of the device, or a positional relationship between an adjacent device of the device and the device.

In an embodiment, the apparatus further includes a report module configured to report position-related information to the service node when the position of the device is located in an edge region of the energy collection region.

In an embodiment, the apparatus further includes a cell selection module configured to select or re-select a cell according to the environment-related information.

In an embodiment, the apparatus further includes a synchronization module configured to control, according to the environment-related information, a local clock to synchronize with a clock of the service node.

In an embodiment, an RRC layer of the device uses a connectionless manner for data transmission.

In an embodiment, a scheduling layer of the device supports a scheduling algorithm including an energy state related factor.

The energy state related factor includes at least one of the following: an absolute value of the strength of the downlink signal or an absolute value of the strength of an energy signal, a determination value of whether the strength of the downlink signal or the strength of the energy signal exceeds a preset threshold, or the strength of the downlink signal or the strength of the energy signal.

In an embodiment, the device supports two layers of protocol stacks. A first-layer protocol stack is configured to perform at least one of the following functions: downlink signal monitoring, radio frequency energy collection, backscattered signal modulation, signal monitoring positioning, or positioning process execution. A second-layer protocol stack is configured to perform at least one of the following functions: mobility management, data transmission management, or positioning process execution.

In an embodiment, data transmission management includes at least one of the following functions: communication data segmentation, communication data reorganization, communication data cascading, and quality of service management.

In an embodiment, the device is in one of the following states: the state of monitoring the downlink signal or the energy signal, the state of information transmission, or the register state of transmitting the device ID or the security code.

In an embodiment, the state of the device is able to be changed according to a preset mode; alternatively, the state of the device is indicated by the service node sending the downlink signal.

The communication apparatus provided in this embodiment and the communication method provided in the preceding embodiments belong to the same concept. For technical details not described in detail in this embodiment, reference may be made to any one of the preceding embodiments, and this embodiment has the same beneficial effects as the communication method performed.

An embodiment of the present application further provides a communication apparatus. FIG. 7 is a structural diagram of a communication apparatus according to an embodiment. As shown in FIG. 7, the communication apparatus includes a downlink sending module 410 and a receiving module 420.

The downlink sending module 410 is configured to send a downlink signal to a device.

The receiving module 420 is configured to receive the information transmitted by the device based on radio frequency energy.

For the communication apparatus of this embodiment, the arrangement in which the transmission information sent by the device using the collected radio frequency energy is received and in which the signal is sent to the device implements efficient and reliable communication with the device and improves the applicability and communication efficiency of the Internet of Things.

In an embodiment, the radio frequency energy is collected according to a radio frequency signal of a radio frequency energy source node; alternatively, the radio frequency energy is collected according to the downlink signal.

In an embodiment, the apparatus further includes a control module configured to control a working parameter of the radio frequency energy source node. The working parameter includes at least one of the following: frequency band, transmission power, or working mode. The working mode includes a manner of starting and/or stopping power transmission.

In an embodiment, the downlink sending module 410 is configured to send the downlink signal to the device by using a set beam mechanism. In the set beam mechanism, the width of a beam is less than a set threshold, or the width of the beam is determined according to a preset rule or the set threshold.

In an embodiment, the downlink signal sent by the service node to the device is configured to at least one of the following: transmit the radio frequency energy to the device, transmit communication data to the device, or carry feedback information corresponding to the backscattered signal.

In an embodiment, the apparatus further includes the operations below.

The device is positioned according to at least one of the power of the backscattered signal, the beam corresponding to the downlink signal, or an energy value of the received downlink signal fed back by the device.

Alternatively, at least one of the power of the backscattered signal, the beam corresponding to the downlink signal, or the energy value of the received downlink signal fed back by the device is transmitted to a positioning server.

Alternatively, at least one of the power of the backscattered signal, the beam corresponding to the downlink signal, or the energy value of the received downlink signal fed back by the device is transmitted to a core network node so as to be transmitted to the positioning server by the core network node.

In an embodiment, the apparatus further includes scheduling a resource according to at least one of the following pieces of information: the condition of the device collecting the radio frequency energy, the capability of the device reflecting the radio frequency energy, the energy strength of the received uplink signal, the energy strength of the received backscattered signal, or a determination value of whether the strength of the uplink signal or the strength of an energy signal exceeds a preset threshold.

In an embodiment, the apparatus further includes an indication module configured to send the indication information of a state to the device. The state includes at least one of the following: the state of monitoring the downlink signal or the energy signal, the state of information transmission, or the register state of transmitting a security code.

In an embodiment, the receiving module 410 is configured to receive, based on a data packet, the information transmitted by the device.

In an embodiment, the apparatus further includes the following: A device ID of the device or the security code is received; and the device ID or the security code is transmitted to the core network node, or an ID of the service node, as well as the device ID or the security code, is transmitted to the core network node.

In an embodiment, the apparatus further includes a transmission module configured to transmit the security code received from the core network node to the device.

The communication apparatus provided in this embodiment and the communication method provided in the preceding embodiments belong to the same concept. For technical details not described in detail in this embodiment, reference may be made to any one of the preceding embodiments, and this embodiment has the same beneficial effects as the communication method performed.

Figure 8:
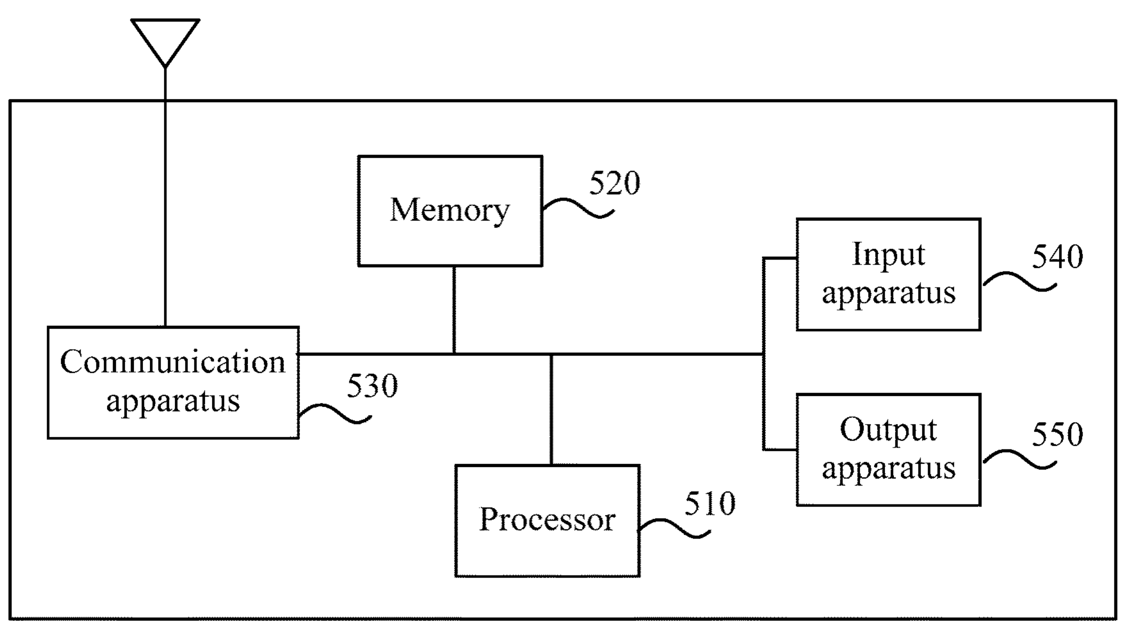
FIG. 8 is a structural diagram of the hardware of a device according to an embodiment.

An embodiment of the present application further provides a device. FIG. 8 is a structural diagram of the hardware of a device according to an embodiment. As shown in FIG. 8, the device provided in the present application includes a memory 520, a processor 510, and a computer program stored in the memory and executable by the processor, where when executing the program, the processor 510 performs a preceding communication method.

The device may further include the memory 520. One or more processors 510 may be provided in the device, and one processor 510 is shown as an example in FIG. 8. The memory 520 is configured to store one or more programs, where the one or more programs are executed by the one or more processors 510 to cause the one or more processors 510 to perform the communication method in embodiments of the present application.

The device further includes a communication apparatus 530, an input apparatus 540, and an output apparatus 550.

The processor 510, the memory 520, the communication apparatus 530, the input apparatus 540, and the output apparatus 550 in the device may be connected through a bus or in other manners, and the connection through the bus is shown as an example in FIG. 8.

The input apparatus 540 may be used for receiving input digital or character information and generating keying signal input related to user settings of the device and function control of the device. The output device 550 may include display devices such as a display screen.

The communication apparatus 530 may include a receiver and a sender. The communication apparatus 530 is configured to perform information transceiving and communication under the control of the processor 510.

As a computer-readable storage medium, the memory 520 may be configured to store software programs, computer-executable programs, and modules, such as program instructions/modules corresponding to the communication method in embodiments of the present application (for example, the collection module 310 and the sending module 320 in a communication apparatus). The memory 520 may include a program storage region and a data storage region. The program storage region may store an operating system and an application program required by at least one function. The data storage region may store data created according to the use of the device. Additionally, the memory 520 may include a high-speed random-access memory and may also include a nonvolatile memory such as at least one disk memory, a flash memory, or another nonvolatile solid-state memory. In some examples, the memory 520 may further include memories located remotely relative to the processor 510 and these remote memories may be connected to the device via the network. Examples of the preceding network include, but are not limited to, the Internet, an intranet, a local area network, a mobile communication network and a combination thereof.

Figure 9:
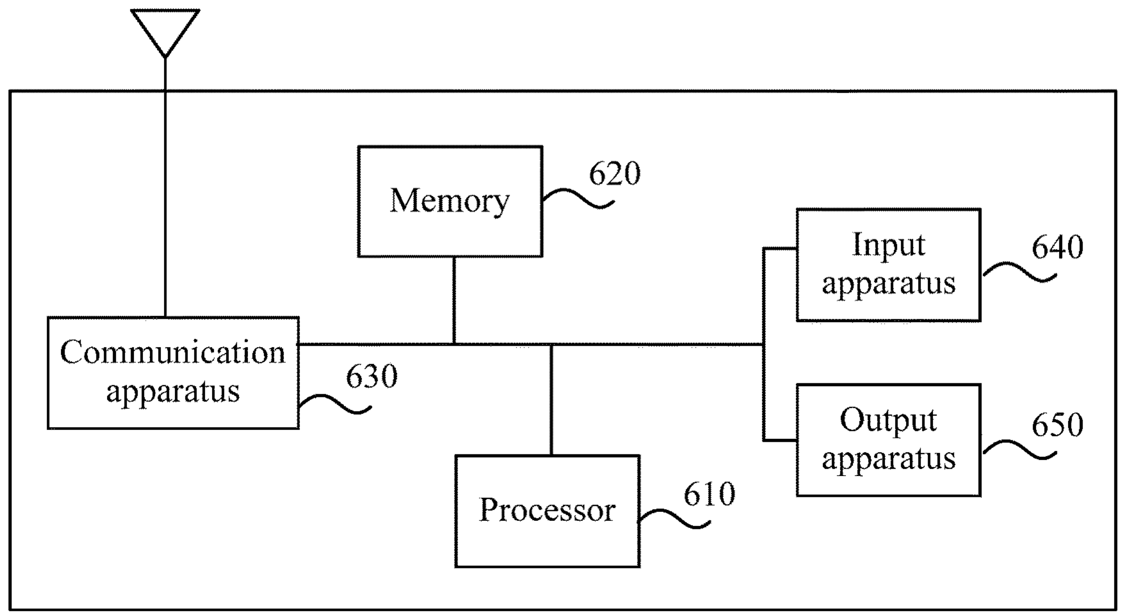
FIG. 9 is a structural diagram of the hardware of a service node according to an embodiment.

An embodiment of the present application further provides a service node. FIG. 9 is a structural diagram of the hardware of a service node according to an embodiment. As shown in FIG. 9, the service node provided in the present application includes a memory 620, a processor 610, and a computer program stored in the memory and executable by the processor, where when executing the program, the processor 610 performs a preceding communication method.

The service node may further include the memory 620. One or more processors 610 may be provided in the communication node, and one processor 610 is used as an example in FIG. 9. The memory 620 is configured to store one or more programs, where the one or more programs are executed by the one or more processors 610 to cause the one or more processors 610 to perform the communication method in embodiments of the present application.

The service node further includes a communication apparatus 630, an input apparatus 640, and an output apparatus 650.

The processor 610, the memory 620, the communication apparatus 630, the input apparatus 640, and the output apparatus 650 in the communication node may be connected through a bus or in other manners, and the connection through the bus is shown as an example in FIG. 9.

The input apparatus 640 may be configured to receive inputted digital or character information and generate key signal input related to user settings and function control of the service node. The output device 650 may include display devices such as a display screen.

The communication apparatus 630 may include a receiver and a sender. The communication apparatus 630 is configured to perform information transceiving and communication under the control of the processor 610.

As a computer-readable storage medium, the memory 620 may be configured to store software programs, computer-executable programs, and modules, such as program instructions/modules corresponding to the communication method in embodiments of the present application (for example, the receiving module 420 and the downlink sending module 410 in a communication apparatus). The memory 620 may include a program storage region and a data storage region. The program storage region may store an operating system and an application program required by at least one function. The data storage region may store data created according to the use of the service node. Additionally, the memory 620 may include a high-speed random-access memory and may also include a nonvolatile memory such as at least one disk memory, a flash memory, or another nonvolatile solid-state memory. In some examples, the memory 620 may further include memories located remotely relative to the processor 610 and these remote memories may be connected to the service node via the network. Examples of the preceding network include, but are not limited to, the Internet, an intranet, a local area network, a mobile communication network and a combination thereof.

An embodiment of the present application further provides a communication system. It is to be noted that for technical details not described in detail in the embodiment, reference may be made to any one of the preceding embodiments.

Figure 10:
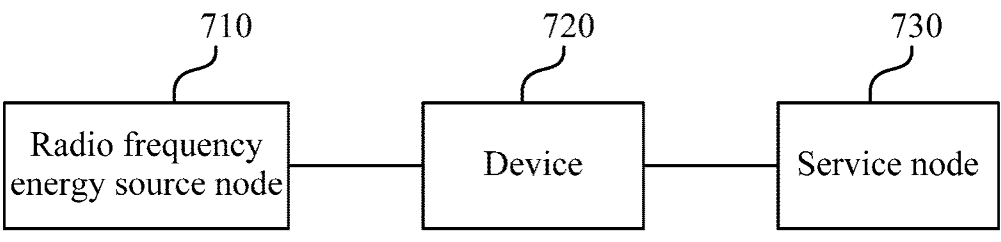
FIG. 10 is a structural diagram of a communication system according to an embodiment.

FIG. 10 is a structural diagram of a communication system according to an embodiment. As shown in FIG. 10, the system includes a radio frequency energy source node 710, a device 720, and a service node 730. The service node 730 is connected to the radio frequency energy source node 710 and the device 720 separately.

In an embodiment, the radio frequency energy source node 710 is a network element independent of the service node 730 and the device 720. The service node 730 is configured to control a working parameter of the radio frequency energy source node 710.

In an embodiment, the radio frequency energy source node 710 is integrated in the service node 730, or the radio frequency energy source node 710 is integrated in an adjacent device of the device 720.

In an embodiment, the system further includes a dedicated network element deployed in a core network. The dedicated network element is configured to manage subscription information of the device and user information.

An embodiment of the present application further provides a storage medium. The storage medium stores a computer program which, when executed by a processor, causes the processor to perform any communication method according to embodiments of the present application. The method includes that radio frequency energy is collected by receiving a radio frequency signal of a radio frequency energy source node and that information is transmitted to a service node based on the radio frequency energy. Alternatively, the method includes that a downlink signal is sent to a device and that the transmission information sent by the device based on radio frequency energy is received.

A computer storage medium in an embodiment of the present application may adopt any combination of one or more computer-readable media. The computer-readable media may be computer-readable signal media or computer-readable storage media. For example, a computer-readable storage medium may be, but is not limited to, an electrical, magnetic, optical, electromagnetic, infrared, or semiconductor system, apparatus, or device or any combination thereof. Examples of the computer-readable storage medium (a non-exhaustive list) include an electrical connection having one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical memory, a magnetic memory, or any suitable combination thereof. The computer-readable storage medium may be any tangible medium including or storing a program. The program may be used by or used in conjunction with an instruction execution system, apparatus, or device.

A computer-readable signal medium may include a data signal propagated in a baseband or as part of a carrier. The data signal carries computer-readable program codes. The data signal propagated in this manner may be in multiple forms, including, but not limited to, an electromagnetic signal, an optical signal, or any suitable combination thereof. The computer-readable signal medium may also be any computer-readable medium other than the computer-readable storage medium. The computer-readable medium may send, propagate, or transmit a program used by or used in conjunction with an instruction execution system, apparatus, or device.

Program codes included in the computer-readable media may be transmitted by any suitable medium including, but not limited to, a wireless medium, a wire, an optical cable, a radio frequency (RF), or any suitable combination thereof.

Computer program codes for performing the operations of the present application may be written in one or more programming languages or a combination of multiple programming languages. The programming languages include object-oriented programming languages such as Java, Smalltalk, and C++ and may further include conventional procedural programming languages such as "C" or similar programming languages. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer through any type of network including a local area network (LAN) or a wide area network (WAN), or may be connected to an external computer (for example, via the Internet provided by an Internet service provider).

The preceding are only example embodiments of the present application and are not intended to limit the scope of the present application.

It is to be understood by those skilled in the art that the term "user terminal" encompasses any suitable type of wireless user device, for example, a mobile phone, a portable data processing apparatus, a portable web browser, or a vehicle-mounted mobile station.

Generally speaking, embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps and logic circuits, modules, and functions. Computer programs may be stored in a memory. The memory may be of any type suitable for a local technical environment and may be implemented using any suitable data storage technology, such as, but not limited to, a read-only memory (ROM), a random-access memory (RAM), or an optical memory device and system (for example, a digital video disc (DVD) or a compact disc (CD)). The computer-readable media may include non-transitory storage media. The data processor may be of any type suitable for the local technical environment, for example, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

The detailed description of example embodiments of the present application is provided above through exemplary and non-restrictive examples. However, considering the drawings and the claims, various modifications and adjustments to the preceding embodiments are apparent to those skilled in the art and do not deviate from the scope of the present application. Accordingly, the proper scope of the present application is determined according to the claims.

What is claimed is:

1. A communication method, applied to a device and comprising:

harvesting radio frequency energy by receiving a radio frequency signal of a radio frequency energy source node; and transmitting information to a service node based on the radio frequency energy;

wherein the method further comprises: receiving a security code sent by the service node before transmitting the information to the service node; wherein the service node and the device are deployed in an Internet of Things (IoT) system that harvests energy from environmental signals; and wherein an air interface protocol stack supported by the device is simplified into a two-layer protocol stack, and the two-layer protocol stack consists of a physical layer protocol stack and a high-layer protocol stack, and wherein a function performed by the high-layer protocol stack comprises segmenting communication data.

2. The method according to claim 1, wherein the device comprises at least one of following: a passive device, a battery-free device, a device having a rechargeable battery, or a device capable of storing energy.

3. The method according to claim 1, wherein transmitting the information to the service node based on the radio frequency energy comprises:

accumulating the radio frequency energy, and when accumulated radio frequency energy exceeds a preset threshold, transmitting the information to the service node; or generating a backscattered signal based on the accumulated radio frequency energy, and transmitting the information to the service node by using the backscattered signal.

4. The method according to claim 1, further comprising one of:

selecting a code sequence for transmitting the information according to at least one of following pieces of information: monitored service node-to-device information or a device identifier (ID) of the device; or determining a code sequence set according to monitored service node-to-device information; and selecting a code sequence for transmitting the information from the code sequence set according to one of following manners:

selecting the code sequence from the code sequence set at random; or selecting the code sequence from the code sequence set according to a device ID of the device.

5. The method according to claim 1, further comprising:

transmitting the security code to the service node before transmitting the information to the service node or in a process of transmitting the information to the service node;

wherein the security code comprises at least one of following: a device ID of the device, or an ID prestored by the device.

6. The method according to claim 1, further comprising one of:

determining a transmission manner of communication data according to a physical feature of a radio channel between the device and the service node, wherein the transmission manner of the communication data comprises at least one of following: the communication data is comprised in a device-to-service-node signal for transmission, the communication data is transmitted along with device-to-service-node signaling, the communication data is comprised in a service node-to-device signal for transmission, the communication data is transmitted along with service node-to-device signaling, data transmission requires feedback, or data transmission does not require feedback; or establishing communication with the service node by using a non-orthogonal multiple access manner, wherein establishing the communication with the service node by using the non-orthogonal multiple access manner comprises at least one of following:

establishing the communication with the service node according to a non-orthogonal multiple access manner based on backscattered signal power difference; or establishing the communication with the service node by using a non-orthogonal code based on time domain extension, wherein the non-orthogonal code is configured to distinguish devices.

7. The method according to claim 1, further comprising:

determining environment-related information of the device according to at least one of following pieces of information:

a service node-to-device signal monitored by the device;

quality of the service node-to-device signal monitored by the device;

energy strength of the service node-to-device signal monitored by the device;

quality of an environmental signal monitored by the device or quality of a peripheral signal monitored by the device;

energy strength of the environmental signal monitored by the device or energy strength of the peripheral signal monitored by the device; or a number of environmental signals monitored by the device or a number of peripheral signals monitored by the device; or determining environment-related information of the device according to at least one of following manners:

monitoring service node-to-device signals continuously;

monitoring the environmental signals or peripheral signals continuously;

monitoring the service node-to-device signals in a duty cycle manner;

monitoring the environmental signals or the peripheral signals in the duty cycle manner;

monitoring the service node-to-device signals in a preset mode;

monitoring the service node-to-device signals in a configured mode;

monitoring the environmental signals or the peripheral signals in the preset mode; or monitoring the environmental signals or the peripheral signals in the configured mode.

8. The method according to claim 7, wherein the environment-related information comprises one of following: information of a position of the device, a positional relationship between the device and an energy harvesting region, a number of adjacent devices of the device, or a positional relationship between an adjacent device of the device and the device.

9. The method according to claim 7, further comprising one of:

reporting position-related information to the service node when a position of the device is located in an edge region of an energy harvesting region;

selecting or re-selecting a cell according to the environment-related information;

or controlling, according to the environment-related information, a local clock to synchronize with a clock of the service node.

10. The method according to claim 1, wherein a scheduling layer of the device supports a scheduling algorithm comprising an energy state related factor; and the energy state related factor comprises at least one of following: an absolute value of strength of a service node-to-device signal or an absolute value of strength of an energy signal, a determination value of whether strength of a service node-to-device signal or strength of an energy signal exceeds a preset threshold, or strength of a service node-to-device signal or strength of an energy signal.

11. The method according to claim 1, wherein the physical layer protocol stack is configured to perform at least one of following functions: service node-to-device signal monitoring, radio frequency energy harvesting, backscattered signal modulation, signal monitoring positioning, or positioning process execution; and the high-layer protocol stack is further configured to perform at least one of following functions: mobility management, data transmission management, or positioning process execution, wherein the data transmission management comprises at least one of the following functions: communication data reorganization, communication data cascading, or quality of service management.

12. The method according to claim 1, wherein the device is in one of following states: a state of monitoring a service node-to-device signal or an energy signal, a state of information transmission, or a register state of transmitting a device ID or the security code.

13. The method according to claim 1, wherein a state of the device is able to be changed according to a preset mode, or the state of the device is indicated by the service node sending a service node-to-device signal.

14. A non-transitory computer-readable storage medium for storing a computer program which, when executed by a processor, causes the processor to perform the communication method according to claim 1.

15. A communication method, applied to a service node and comprising:

sending a service node-to-device signal to a device; and receiving information transmitted by the device based on radio frequency energy;

wherein the method further comprises: transmitting a security code to the device before receiving information transmitted by the device; wherein the service node and the device are deployed in an Internet of Things (IoT) system that harvests energy from environmental signals; and wherein the information is transmitted by the device in a manner adapted to a simplified two-layer protocol stack of the device, the simplified two-layer protocol stack consisting of a physical layer protocol stack and a high-layer protocol stack configured to perform a function of segmenting communication data.

16. The method according to claim 15, further comprising one of:

controlling a working parameter of a radio frequency energy source node, wherein the working parameter comprises at least one of following: frequency band, transmission power, or working mode, wherein the working mode comprises a manner of starting and/or stopping power transmission;

positioning the device according to at least one of power of a backscattered signal, a beam corresponding to the service node-to-device signal, or an energy value of a received service node-to-device signal fed back by the device;

transmitting at least one of the power of the backscattered signal, the beam corresponding to the service node-to-device signal, or the energy value of the received service node-to-device signal fed back by the device to a positioning server;

transmitting at least one of the power of the backscattered signal, the beam corresponding to the service node-to-device signal, or the energy value of the received downlink service node-to-device fed back by the device to a core network node so as to be transmitted to the positioning server by the core network node; or receiving a device identifier (ID) of the device or the security code; and transmitting the device ID or the security code to a core network node, or transmitting an ID of a service node, as well as the device ID or the security code, to the core network node.

17. The method according to claim 15, wherein sending the service node-to-device signal to the device comprises:

sending the service node-to-device signal to the device by using a set beam mechanism, wherein in the set beam mechanism, a width of a beam is less than a set threshold, or the width of the beam is determined according to a preset rule or the set threshold.

18. A service node, comprising a memory, a processor, and a computer program stored in the memory and executable by the processor, wherein when executing the program, the processor performs the communication method according to claim 15.

19. A device, comprising a memory, a processor, and a computer program stored in the memory and executable by the processor, wherein when executing the program, the processor performs a communication method, wherein the communication method comprises:

harvesting radio frequency energy by receiving a radio frequency signal of a radio frequency energy source node; and transmitting information to a service node based on the radio frequency energy;

wherein the method further comprises: receiving a security code sent by the service node before transmitting the information to the service node; wherein the service node and the device are deployed in an Internet of Things (IoT) system that harvests energy from environmental signals; and wherein an air interface protocol stack supported by the device is simplified into a two-layer protocol stack, and the two-layer protocol stack consists of a physical layer protocol stack and a high-layer protocol stack, and wherein a function performed by the high-layer protocol stack comprises segmenting communication data.

* * * * *